Patented June 17, 1952

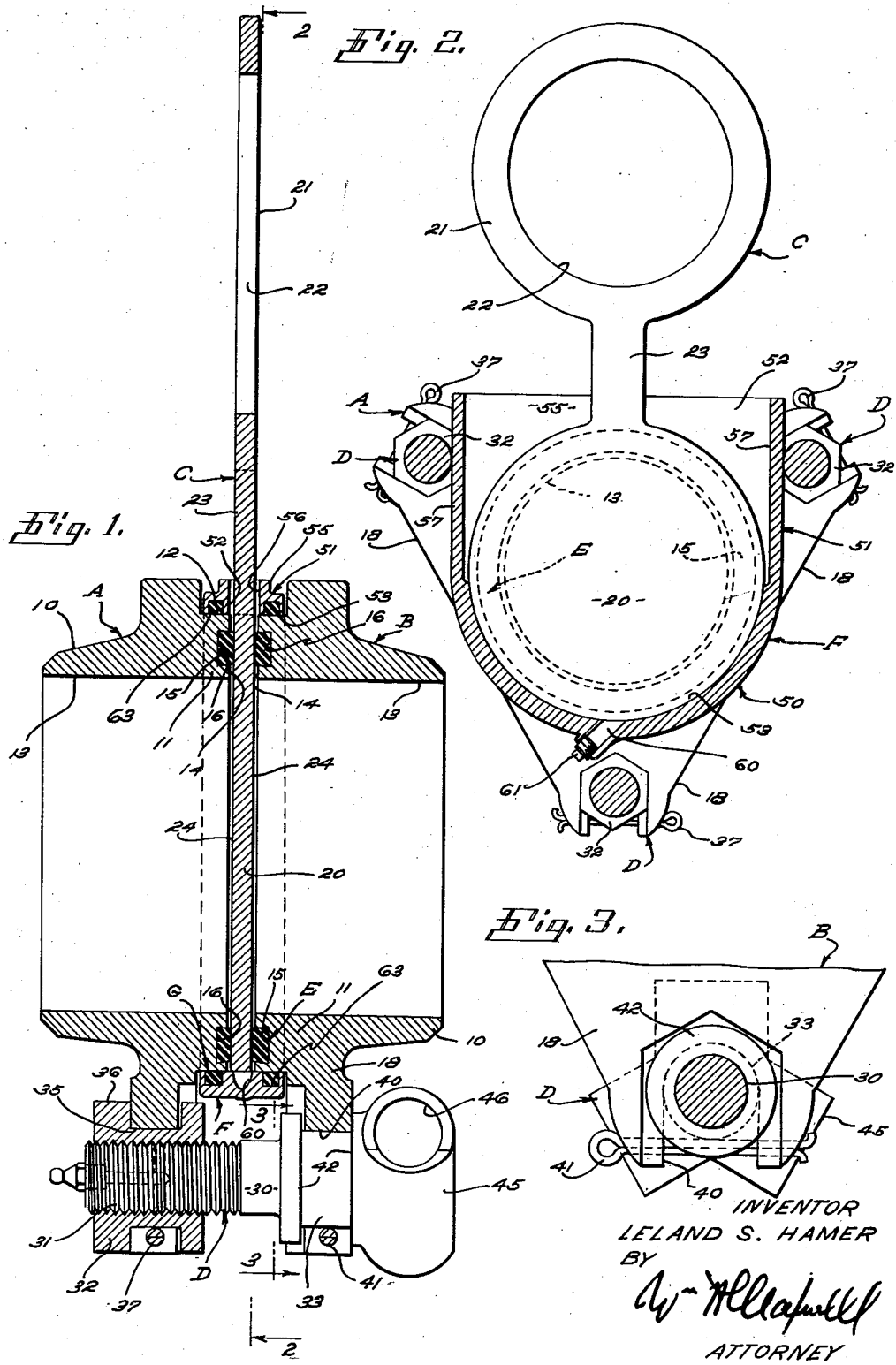

2,600,497

UNITED STATES PATENT OFFICE 2,600,497

LINE BLIND CONSTRUCTION

Leland S. Hamer, Long Beach, Calif., assignor of one-fourth to Paul A. Dewhirst, Los Angeles, Calif.

Application March 1, 1948, Serial No. 12,458

7 Claims. (Cl. 138—89)

This invention has to do with a line blind construction, it being a general object of the invention to provide a simple, practical, improved structure for a line blind fitting, or the like.

Pipe lines and the like are frequently equipped with line blind fittings, and where such structures are employed it is usually necessary that a positive or absolutely tight shut-off be obtained, and it is highly desirable that there be no leakage or drainage of the fluid at the fitting at any time.

It is a general object of the present invention to provide a line blind construction in which the principal working parts are of simple, practical, dependable construction and which involves a catch basin related to the other elements so that it receives and holds material that might otherwise drip or leak from the structure.

A further object of the present invention is to provide a construction of the general character referred to which involves a catch basin applicable to the body sections of the fitting which are joined to the pipes and engage the flow controlling plate. With the construction of the present invention the catch basin is in the nature of an accessory or an attachment that may or may not be used, as circumstances require, and which does not in any way interfere with, impair, or modify the normal working action of the principal parts of the fitting.

A further object of the present invention is to provide a simple, inexpensive part in the form of a catch basin applicable to a simple, dependable type of line blind fitting to catch material that might otherwise drip or drain from the fitting.

The various objects and features of my invention will be fully understood from the following detailed description of a typical preferred form and application of the invention, throughout which description reference is made to the accompanying drawings, in which:

Fig. 1 is a longitudinal, vertical, sectional view of a construction embodying the present invention. Fig. 2 is a reduced, transverse, sectional view taken as indicated by line 2—2 on Fig. 1, and Fig. 3 is a sectional view taken as indicated by line 3—3 on Fig. 1.

The structure illustrated in the drawings and embodying the present invention involves, generally, two body sections A and B, a plate C between the sections, means D coupling the body sections and operable to clamp them to the plate, sealing means E between the body sections and the plate, a catch basin F carried by the body sections and passing or accommodating the plate C, and sealing means G between the catch basin and the body sections.

The body sections A and B are preferably like opposed members or elements, and it is a feature of the present invention that they may be of simple, inexpensive, yet practical rugged construction. In the form of the invention illustrated each body section is a tubular unit with an outer end portion 10 to be coupled with a pipe, or the like, and with an inner end portion 11 with a round or turned exterior 12 concentric with the opening or passage 13 that extends through the unit, and with a flat end 14 opposing the plate. In the particular form illustrated the outer end portion of each body section is shown bevelled or tapered to facilitate welding of the body section to a pipe, or the like. It is to be understood that in practice any suitable form or type of connecting means may be employed on or in connection with each body section for joining it to a pipe, or the like.

It is preferred, in practice, that the opening 13 through each body section be a straight, round opening, and it is desirable that the exterior 12 of the inner end portion of each body section be turned or otherwise formed so that it is round and concentric with the opening 13. The inner or plate end 14 of each body section may be a flat part or surface in a plane normal to the axis of the passage-way 13 and where the sealing means E is carried by the body sections the ends 14 are of sufficient extent or width to adequately accommodate the sealing means.

In the form of the invention illustrated the sealing means E is formed by sealing or packing rings 15 arranged to occur between opposite sides of the plate C and the ends 14 of the body sections. The packing rings 15 are shown held in or carried by suitable channels 16 provided in the ends 14 of the body sections.

In the particular form of the invention illustrated, outwardly projecting flanges or lugs 18 are provided on the exterior of each body section intermediate the ends thereof to receive and carry the coupling means D. In the drawings three such lugs or flanges are provided on or occur at the exterior of each body section, in which case the flanges or lugs are spaced circumferentially to be substantially 120° apart.

The plate C may, in practice, be any suitable flow controlling or regulating member, for instance, it may be provided for shutting off flow completely, or for regulating flow, as circumstances require. In the case illustrated a double-ended plate C is shown, and in this case the plate has one end 20 which is solid or imperforate and has a second end 21 which is provided with an aperture 22 corresponding in size and shape with the opening 13 through the body sections.

With this particular form or type of plate, flow is completely shut off when the end 20 of the plate is in operating position, as shown in Figs. 1 and 2 of the drawings, whereas flow is in no way restricted or impeded when the end 21 is in operating position. In the particular construction illustrated the ends 20 and 21 of the plate are joined by a neck 23 which holds the plates rigidly connected and in suitable spaced relation. In the particular case illustrated the sealing means E, being carried by the body sections, the sides 24 of the plate are plain, smooth or flat sides to be engaged by the packing rings 15 and by the ends 14 of the body sections upon the body sections being operated into full clamping engagement with the plate.

The coupling means D preferably involves a plurality of screw members connecting lugs 18 of the body sections. In the preferred arrangement the lugs of the two body sections occur opposite each other, or in line with each other axially of the structure, and the screw members of the means D in connecting the body sections extend between the aligned lugs. When each body section is provided with three lugs 18 the means D involves three screw members.

In the form of the invention illustrated in the drawings each screw member includes an elongate shank 30 threaded at one end 31 into a nut 32 carried by one body section and provided at its other end with a head or enlarged portion 33 carried by the other body section. In the case illustrated the lugs 18 of body section A are provided with recesses or notches 35 in which the nuts 32 are seated and the nuts 32 have end flanges 36 that overhang or overlie the sides of the notched lug so that the nut is held against movement axially of the fitting. A suitable retainer, such as a key 37, extends between the spaced outer portions of each lug 18 retaining the nut against outward displacement.

The enlarged head portion 33 of each screw member is preferably round and seated in a notch or recess 40 provided in a lug 18 on body section B so that it is free to rotate therein. A retainer or key 41 holds each head part 33 in its supporting notch against becoming displaced therefrom. Flanges 42 project from the heads 33 and engage or overlie the sides of the flanges or body B so that the screw members are coupled to body B against axial movement relative thereto.

In the preferred form of the invention a tool engaging part 45 is provided on each screw member, preferably outward of the head 33, so that the screw member can be engaged by a suitable operating tool. In the case illustrated each part 45 is shown with apertures 46 suitable for the reception of an operating bar or the like.

The catch basin F provided by the present invention is characterized by an annular or ring-like element 50 surrounding and extending between the inner end portions 11 of the body sections A and B and a lateral extension 51 on or projecting from the element 50 and establishing a plate passage 52 admitting one end or the other of plate C into operating position between the ends of the body sections A and B.

Aligned bores or round openings 53 enter the annular element 50 of the basin F from opposite ends of the basin to slidably receive the end portions 11 of the sections A and B. The exteriors 12 of portions 11 and the bores 53 of element 50 are such as to provide a sliding fit between the body sections and the element 50 of the basin F.

The element 50 of the basin F is of limited extent radially, that is, it projects but a short distance radially outward from the end portions 11 of the body section so that it does not in any way interfere with the elements or parts of coupling means D.

The lateral extension 51 of the basin F occurs between the two end portions of the basin and forms or defines the passage 52 that accommodates the plate F so that either end of the plate can be readily moved into and out of operating position without being in any way interfered with by the catch basin. In the particular construction illustrated the extension 51 has side walls 55 which are substantially flat and are somewhat wider apart than the plate C is thick, providing ample clearance as at 56 to pass the plate into and out of operating position between the ends of the body sections A and B. End walls 57 join the side walls and like the side walls are vertically disposed. In combination the side walls 55 and end walls 57 of the extension 51 combine to form an upwardly opening receptacle closed at its lower end by a portion of the element 50, as clearly shown in Fig. 2 of the drawings.

In accordance with the construction of the present invention the end walls 57 of the extension 51 are spaced apart far enough to pass the ends 20 and 21 of plate C between them with ample clearance when the parts are positioned as shown in Fig. 2, and the extension 51 is related to units of the means D so that there are two upper units of means D spaced apart far enough to pass the extension upwardly between them. In the case illustrated the end walls 57 of extension 51 engage the two uppermost members 30 of the means D so that the members 30, which are anchored to the lugs of the body sections hold the catch basin F against rotation on or about the body sections, holding the extension 51 in an upright position so that it will hold any liquid or material that may seep or drain into it from either body section.

It is preferred, in practice, that a drain opening 60 be provided in the bottom or lowermost part of element 50 of the catch basin which opening 60 may be normally closed by a removable plug 61.

The means G provided for sealing between the catch basin and the body sections includes sealing rings. It is preferred that there be a sealing ring engaging or sealing between each body section and the adjoining end portion of the catch basin. In the particular case illustrated the sealing rings are carried in annular grooves or channels 63 provided in the end portions of the element 50 which surround and receive the end portions 11 of the body sections A and B.

From the foregoing description it will be apparent that the principal working parts of the line blind fitting involve the body sections A and B, the plate C and the means D, and that these parts work or operate to clamp the plate between the body sections without being interfered with in any way by the catch basin F. The catch basin F may be considered in the nature of an attachment or supplemental element applied to the sections A and B when necessary or desired, and when it is used it is held in upright operating position through cooperation, as above described.

With the catch basin held in the normal upright position liquid or material escaping from between the body sections and the plate, or that would drain from the structure when the plate is removed or is being changed end for end, is caught by the catch basin F and may be drained therefrom by removal of the plug 61.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A fitting of the character described including, two tubular opposed body sections each with a flange and an inner end portion projecting from the flange and axially of the fitting, clamp means coupling the sections and adapted to shift them axially relative to each other, a plate between the said portions of the sections and engaged thereby, a catch basin separate from the body sections and carried by and extending between the said portions of the sections, the catch basin extending completely around the said portions of the sections and having a lateral extension located between the flanges and passing the plate into and out of operating position between the said portions of the sections, and sealing means engaged around each of said portions of the sections and with the catch basin.

2. A pipe line fitting of the character described including, two like aligned oppositely disposed cylindrical tubular body sections with opposed inner end portions the exteriors of which are curved concentrically with the sections and extend parallel with the axis of the sections, clamp means coupling the sections and adapted to shift them axially relative to each other, a plate between and engaged by the said portions of the sections, a catch basin with like end openings slidably receiving the end portions of the sections and with a lateral extension located between the flanges and passing the plate into and out of operating position between the end portions of the sections, and sealing means engaged around each of said portions of the sections and with the catch basin.

3. A fitting of the character described including two body sections with opposed axially aligned inner end portions with turned exteriors, clamp means coupling the sections and operating them relative to each other axially of the fitting, a plate clamped between the said portions of the sections, and a catch basin carried on and extending between the said portions of the sections and having a lateral extension passing the plate into and out of operating position between the said portions of the sections, the basin having aligned end openings slidably receiving the said end portions of the sections, said means including parts circumferentially spaced around the body and engaging the basin and holding it against rotation relative to the body sections.

4. A fitting of the character described including, two like oppositely disposed tubular body sections with opposed turned inner end portions, clamp means coupling the sections, an elongate plate between the said portions of the sections with a part projecting laterally therefrom, a catch basin with round end openings slidably receiving the end portions of the sections and with a lateral extension projecting radially from one side of the fitting and passing the plate into operating position between the end portions of the section, and sealing means engaged around the inner end portions of the sections and in said end openings of the basin, the said clamp means including circumferentially spaced fasteners extending between the body sections, one located diametrically opposite the extension of the basin and one located at each side of said extension of the basin.

5. A fitting of the character described including two like oppositely disposed body sections with opposed inner end portions, clamp means coupling the sections and operating the sections relative to each other, a plate between the said portions of the sections and clamped thereby, a catch basin slidably receiving said end portions and extending between the said portions of the sections and having a lateral extension passing the plate into and out of operating position between the said portions of the sections, separate sealing means between the plate and each of the body sections, and separate sealing means between the basin and each of the body sections.

6. A catch basin applicable to a fitting with opposed body sections clamped to a plate including, an annular element with like ends having round openings adapted to slidably receive the body sections, and a lateral extension on said element establishing a passage passing the plate into and out of position between the body sections.

7. A catch basin applicable to a fitting with opposed body sections clamped to a plate including, an annular element with like oppositely projecting end portions with aligned end openings adapted to slidably receive the body sections, there being an annular channel in the wall of each end opening, packing rings carried in the said channels adapted to engage the sections to seal therewith, and a lateral extension on said element establishing a passage adapted to pass the plate into and out of position between the body sections.

LELAND S. HAMER.

REFERENCES CITED

The following references are of record in the file of this patent:

UNITED STATES PATENTS

| Number | Name | Date |
| --- | --- | --- |
| 1,813,100 | Swindle | July 7, 1931 |
| 2,271,138 | Hamer | Jan. 27, 1942 |
| 2,344,747 | Sperry et al. | Mar. 21, 1944 |